United States Patent
Larsson et al.

(10) Patent No.: US 6,872,046 B2
(45) Date of Patent: Mar. 29, 2005

(54) ENCLOSURE FOR OIL LUBRICATED, ROTATING ELEMENTS

(75) Inventors: Per Larsson, Göteborg (SE); Kent Giselmo, Vellinge (SE)

(73) Assignee: Volvo Lastvagnar AB, Göteberg (SE)

(*) Notice: Subject to any disclaimer, the term of this patent is extended or adjusted under 35 U.S.C. 154(b) by 1 day.

(21) Appl. No.: 10/249,996

(22) Filed: May 27, 2003

(65) Prior Publication Data

US 2004/0005231 A1 Jan. 8, 2004

Related U.S. Application Data

(63) Continuation of application No. PCT/SE01/02148, filed on Oct. 3, 2001, now abandoned.

(30) Foreign Application Priority Data

Nov. 27, 2000 (SE) .............................................. 0004406

(51) Int. Cl.[7] .............................................. F01D 11/00
(52) U.S. Cl. ........................ 415/111; 415/175; 417/406; 184/6.12
(58) Field of Search ........................ 415/111–112, 175, 415/2, 29, 122.1; 417/406–409; 123/559.1; 184/6.11–6.12, 6.28, 11.2

(56) References Cited

U.S. PATENT DOCUMENTS

| 3,810,528 A | * | 5/1974 | Morley et al. ............. 184/6.11 |
| 4,142,608 A | * | 3/1979 | Sarle ......................... 184/6.11 |
| 4,231,266 A | * | 11/1980 | Nishikawa et al. ........... 74/467 |
| 4,586,337 A | * | 5/1986 | Fox ............................ 60/605.1 |
| 5,222,355 A | * | 6/1993 | Karlsson et al. .............. 60/624 |
| 5,323,610 A | * | 6/1994 | Fransson et al. .............. 60/339 |
| 5,692,841 A | * | 12/1997 | Rivard ....................... 384/276 |
| 5,884,482 A | * | 3/1999 | Lange et al. .................. 60/624 |

* cited by examiner

Primary Examiner—F. Daniel Lopez
Assistant Examiner—James M. McAleenan
(74) Attorney, Agent, or Firm—Novak Druce & Quigg, LLP

(57) ABSTRACT

Enclosure for liquid lubricated rotating elements (12, 16, 17). A first rotating element (16) with at least one bearing (13, 14, 15) lubrication fluid drainage point that cooperates with a second rotating element (17). A partition wall (21) is mounted between the drainage point and the second element (16, 17), in such a manner that lubrication fluid is substantially prevented from migrating from the drainage point to the second element.

14 Claims, 1 Drawing Sheet

ENCLOSURE FOR OIL LUBRICATED, ROTATING ELEMENTS

CROSS REFERENCE TO RELATED APPLICATIONS

The present application is a continuation patent application of International Application No. PCT/SE01/02148 filed Oct. 3, 2001 now abandoned, which was published in English pursuant to Article 21(2) of the Patent Cooperation Treaty and which claims priority to Swedish Patent Application No. 0004406-5 filed Nov. 27, 2000. Both applications are expressly incorporated herein by reference in their entireties.

BACKGROUND OF INVENTION

1. Technical Field

The present invention relates to an enclosure for liquid lubricated rotating elements, wherein a first rotating element with at least one bearing lubrication fluid drainage point cooperates with a second rotating element.

2. Background of the Invention

Turbo units are often used for extracting energy from engine exhaust gases, wherein the turbo unit comprises an exhaust driven turbine which drives a compressor for compressing the intake air supplied to the engine, so called supercharging. A turbo compound unit is sometimes arranged after the turbo unit for extracting some of the remaining energy from the exhaust gases. One example of such a turbo compound unit is a second exhaust driven turbine which e.g. mechanically transfers energy to the drive shaft of the engine or the like.

The turbo compound unit normally comprises (includes) a shaft in a bearing with a rigidly mounted turbine wheel that can be driven at high speed by the exhausts, e.g. up to about 80,000 rpm. This speed is reduced by means of a gear train; and possibly other methods, down to a considerably lower speed and is transferred to the engine shaft via a fluid coupling which prevents torsional vibration occurring in the engine shaft to be transmitted to the turbine shaft. Normally, a very efficient lubrication of the turbine shaft bearing is needed in order to endure the high rotation speeds that occur. For this object, lubrication oil may be fed with an overpressure of about 1–5 bar to the turbine bearing.

It appears that the oil leaving the turbine bearing which is supposed to drain down into the crankcase, may hit the fluid coupling which is rotating with high speed, as well as other rotating parts. This results in a formation of a turbulent spray of drops that move in the radial direction outwards until they hit the surrounding surfaces. It has been discovered that these types of oil flows impede the rotation of the fluid coupling, which negatively influences the efficiency.

SUMMARY OF INVENTION

One object of the invention is therefore to provide an enclosure of the rotating fluid lubricated element that avoids the problem described above.

For this object, the enclosure according to the invention is characterized by a partition wall that is mounted between the drainage point and the second element, in such a manner that lubrication fluid is substantially prevented from migrating from the drainage point to the second element.

BRIEF DESCRIPTION OF DRAWINGS

The invention will be further described in the following, in a nonlimiting way with reference to the accompanying drawing in which.

DETAILED DESCRIPTION

Figure 1:
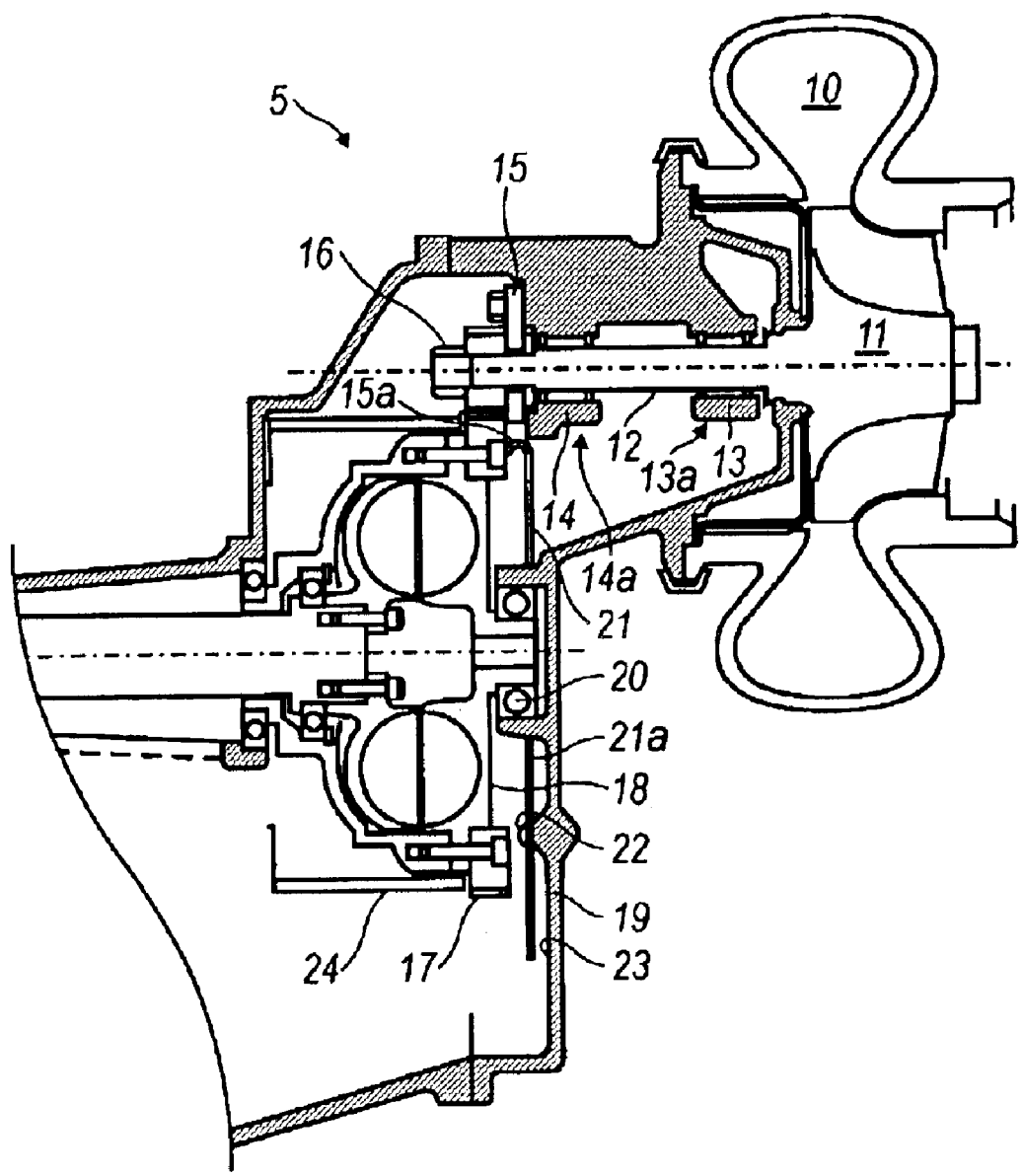
FIG. 1 is a partial cross-section and partial cutaway view taken in the vertical direction through a turbo compound unit configured according to the teachings of the present invention.

The turbo compound unit shown in the figure is meant for use in a combustion engine, preferably included in the drive train of a heavy truck or a bus.

The turbo compound unit comprises a power turbine 11 located in an exhaust channel 10 which turbine is mounted on a turbine shaft 12. The shaft is mounted by means of a front radial bearing 13, a rear radial bearing 14 and a thrust bearing 15. Lubrication oil is fed to these bearings via channels with an overpressure in the range of about 1–5 bar. The oil is drained from these bearings via provided draining points.

A gearwheel 16 is rigidly connected to the shaft 12 and is in mesh with a larger gearwheel 17 that belongs to the primary side of a fluid coupling 18, that is carried in a combined radial and axial bearing 20 at a front end wall 19 of the turbo compound housing. Thus, rotation energy is transferred from the turbine shaft via the fluid coupling to its secondary side.

The lubricating oil having passed through the bearings 13, 14, 15 and being present in front of the gearwheel 17 is intended to flow down along the inside of the front end wall 19 of the turbo compound housing. A partition wall 21, also referred to as a lubrication shield means, is mounted in the space between the end, wall 19 and the gear wheel 17 by means of, for example, a screw 22, so that there is a gap 23 between the partition wall and the inside of the end wall 19. The partition wall 21 is formed by a piece of sheet metal, which is provided with an opening 21a for the fluid coupling bearing 20 and which otherwise essentially follows the sides of the turbo compound housing with its edges.

Due to the arrangement of the partition wall 21 in the space between gearwheel 17 and the end wall 19, the oil may drain into the gap space 23, without being affected by the turbulence being generated by the rotation of the gear wheel 17. The comparatively small amount of oil that may hit the gear wheel 17 and be thrown in the direction radially outwards by the wheel, will, among other things, hit the side of the partition wall that is turned towards the gear wheel and can flow down along this surface.

In order to avoid having oil from the rear radial bearing 14 and the axial bearing 15 hitting the gear wheel 17 or the coupling 18, or other moving parts, a peripheral shield 24 has been arranged around the fluid coupling 18, so that the oil may not be forced into the fluid coupling, and instead has to move along the outside of the shield 24 down into the draining space. This shield may at the same time function as blast protection for rotating parts; e.g., the coupling 18.

The invention may be alternatively described as a turbo compound unit (5) of a combustion engine in which the power turbine 11 is driven by gases of the exhaust channel 10. The turbo compound unit (5) comprises, or includes, a housing (25) that encloses at least a portion thereof. The turbo compound unit (5) further has the driven shaft (12) that is configured to be rotatably driven by the exhaust driven turbine (11). Preferably several (a plurality of) bearing sets (13, 14, 15), but in any event, at least one bearing set, are arranged about the driven shaft (12) for holding the shaft (12) during rotation. The bearing sets (13, 14, 15) are pressure lubricated and each have a drain point (13a, 14a, 15a) for releasing lubrication after application to the particular bearing set. The first gear (16) is rotatably operated by the driven shaft (12) and a second gear (17) is rotatably operated by the first gear (16). As illustrated, the first gear (16), the second gear (17), the bearing sets (13, 14, 15), and the driven shaft (12) are all commonly enclosed within the housing (25), and the housing (25) defines a clear space between the drain points (13a, 14a, 15a) of the bearing sets (13, 14, 15) and the second gear (17). A lubrication shield means (21) is positioned within the housing (25) for deflecting the released lubrication from the drain points (13a, 14a, 15a) away from the second gear (17) and for improving efficiency of the turbo compound unit (5) by preventing undesired mass, constituted by the released lubrication, from contacting the second gear (17).

In that the driven shaft (12) is a component of a turbo compound unit (5), the shaft (12) is configured to be rotatably driven at speeds exceeding 50,000 revolutions per minute, and preferably at approximately 80,000 revolutions per minute.

The lubrication shield means (21) is constructed from sheet material, preferably sheet metal, and is positioned interstitially between the housing (25) and the second gear (17). In the illustrated embodiment, the lubrication shield means (21) is fastened to the housing (25) with a gap space (23) therebetween using a threaded member such as a bolt or screw. The gap space (23) provides a channel within which the released lubrication downwardly drains within the housing (25) and is partitioned away from the second gear (17).

The invention is not limited to the above-described embodiments, but several modifications are possible within the scope of the following claims.

What is claimed is:

1. An enclosure for liquid lubricated rotating elements (12, 16, 17), wherein a first gear (16), operated by a shaft (12) with at least one bearing (13, 14, 15) lubrication fluid drainage point cooperates with a second gear (17), said enclosure comprising: a partition wall (21) mounted between the drainage point and the second gear (17) in such a manner that lubrication fluid passing through the drainage point is substantially prevented from migrating from the drainage point to the second gear (17).

2. The enclosure as recited in claim 1, wherein the partition wall (21) constitutes a shield plate.

3. The enclosure as recited in claim 1, further comprising: a train of gears arranged to transfer rotation from said shaft (12) to said second gear (17).

4. The enclosure as recited in claim 3, wherein the gear (17) is non rotatably connected to the primary side of a fluid coupling (18) of a turbo compound unit.

5. The enclosure as recited in claim 4, wherein the fluid coupling is surrounded by a blast protection plate (24) configured to lead lubrication oil past the fluid coupling (18).

6. A turbo compound unit of a combustion engine, the turbo compound unit comprising: a turbo compound unit and a housing for at least a portion thereof, said turbo compound unit having a driven shaft configured to be rotatably driven by an exhaust driven turbine; a bearing set arranged about said driven shaft for holding said driven shaft during rotation, said bearing set is pressure lubricated and having a drain point for releasing lubrication after application to said bearing set; a first gear rotatably operated by said driven shaft and a second gear rotatably operated by said first gear; said first gear, said second gear, said bearing set, and said driven shaft is commonly enclosed within said housing, and said housing defining a clear space between said drain point of said bearing set and said second gear; and a lubrication shield means positioned within said housing for deflecting the released lubrication from said drain points away from said second gear and for improving efficiency of said turbo compound unit by preventing undesired mass, constituted by the released lubrication, from contacting said second gear.

7. The turbo compound unit as recited in claim 6, further comprising: a plurality of bearing sets, each bearing set arranged about said driven shaft for holding said driven shaft during rotation, and each of said bearing sets is pressure lubricated and having a drain point for releasing lubrication after application to the respective bearing set; each of said bearing sets is commonly enclosed within said housing, and said housing defining a clear space between each of said drain points of said bearing sets and said second gear; and said lubrication shield means positioned within said housing for deflecting the released lubrication from each of said drain points away from said second gear and for improving efficiency of said turbo compound unit by preventing undesired mass, constituted by the released lubrication, from contacting said second gear.

8. The turbo compound unit as recited in claim 6, further comprising: said driven shaft of said turbo compound unit is configured to be rotatably driven at speeds exceeding 50,000 revolutions per minute.

9. The turbo compound unit as recited in claim 6, further comprising: said driven shaft of said turbo compound unit is configured to be rotatably driven at speeds of approximately 80,000 revolutions per minute.

10. The turbo compound unit as recited in claim 6, further comprising: said lubrication shield means is constructed from sheet material and positioned interstitially between the housing and the second gear.

11. The turbo compound unit as recited in claim 10, further comprising: said lubrication shield means is fastened to said housing with a gap space therebetween, said gap space forming a channel within which the released lubrication downwardly drains within said housing and is partitioned away from said second gear.

12. The turbo compound unit as recited in claim 11, further comprising: said lubrication shield means is fastened to said housing by a threaded member.

13. The turbo compound unit as recited in claim 6, further comprising: a power turbine configured to be located in an exhaust channel of a combustion engine, said power turbine connected to said driven shaft at an opposite end from said first gear.

14. A turbo compound unit (5) of a combustion engine comprising:
   a driven shaft (12) supported by at least one bearing set (13, 14, 15) having at least one drain point (13a, 14a, 15a) for releasing lubrication after application to said at least one bearing set (13, 14, 15);
   a first gear (16) secured to the driven shaft (12) for rotation therewith;
   a second gear (17) engaging the first gear (16) to cause rotation of the second gear (17);
   a lubrication shield (21) for deflecting lubrication from the at least one drain point (13a, 14a, 15a) away from the second gear(17); and
   a housing (25) enclosing said driven shaft (12), said first gear (16), said second gear (17), said at least one bearing set (13, 14, 15), and said lubrication shield (21) positioned in said housing (25) between said at least one drain point (13a, 14a, 15a) and said second gear (17).

* * * * *